Jan. 24, 1961 H. E. MILLS 2,969,231
HEAD HOLDER
Filed Feb. 2, 1960
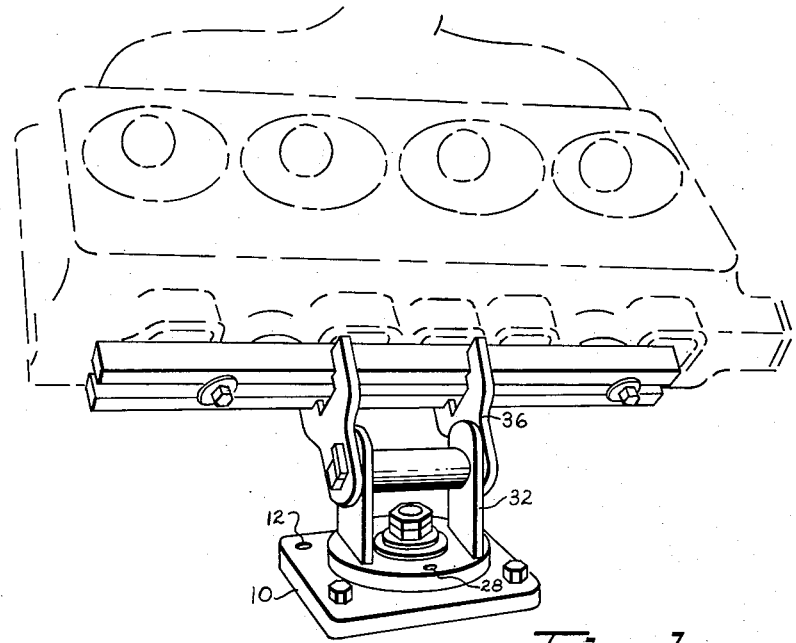
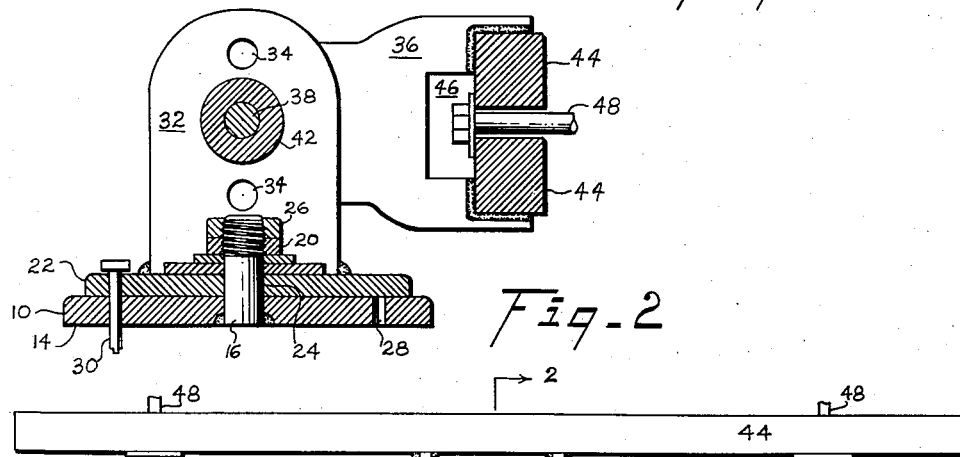
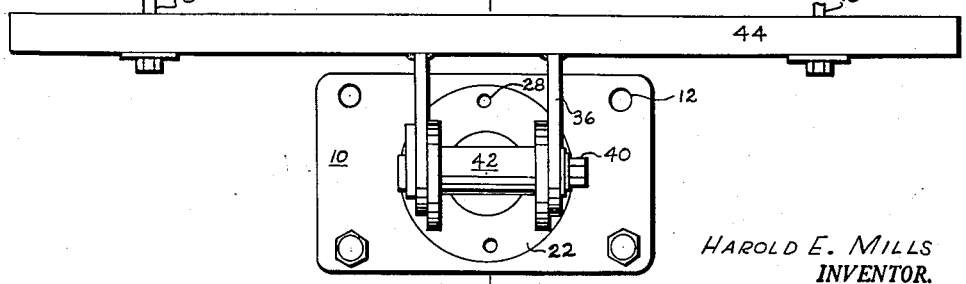
HAROLD E. MILLS
INVENTOR.
BY

United States Patent Office 2,969,231
Patented Jan. 24, 1961

2,969,231

HEAD HOLDER

Harold E. Mills, 4701 40th, Lubbock, Tex.

Filed Feb. 2, 1960, Ser. No. 6,207

6 Claims. (Cl. 269—185)

This invention pertains to work holders and more particularly to a holder to hold the head of an automobile engine while repair work is being conducted thereon.

An object of this invention is to provide a holder to which the head of an automobile engine may be firmly clamped.

Another object of this invention is to provide such a holder wherein the head may be adjusted to any angle desired.

Another object of this invention is to provide such a holder wherein there is no possibility of the head falling from the holder.

A further object of this invention is to provide such a holder which will accommodate the heads of all model automobile engines as well as adapted for other work pieces.

A further object is to provide a holder by which the exhaust manifold may be left on the head during attachment and work.

Still further objects are to achieve the above with a device that is sturdy, compact, durable, simple, and reliable, yet inexpensive and easy to manufacture.

The specific nature of the invention as well as other objects, uses, and advantages thereof will clearly appear from the following description and from the accompanying drawing, in which:

Fig. 1 is a perspective view of an embodiment of this invention with the head shown in phantom.

Fig. 2 is a cross-sectional view of the device shown in Fig. 1.

Fig. 3 is a plan view of the device shown in Fig. 1.

As may be seen in the drawings, the holder basically consists of two parallel bars adapted to pivot about a horizontal axis which itself is adapted to pivot about a vertical axis.

Base plate 10 is a suitably heavy plate of steel or iron with four holes 12 therethrough for attaching the plate to a suitable work bench or other support. The base plate has a plane surface lower side 14 so that it is readily adaptable to fit flat against the supporting surface.

Pintle 16 rises from the side of the base plate opposite the plane surfaced lower side. The pintle may be attached to the base plate by welding or otherwise and it is approximately centered within the base plate. The upper portion of the pintle has threads with nut 20 screwed thereon. The pintle is normal to the plane surface 14, which lies in a general horizontal plane.

Second plate 22 has hole 24 in the center of it. The second plate is also of steel or iron of suitable thickness and the pintle 16 extends through the hole 24 so that the second plate lies flat against the first plate. As may be seen, the second plate may be rotated about the vertical axis of the pintle and locked in any selective position by tightening the nut 20 upon the threads of the pintle. Lock nut 26 may be used to hold the nut in its tightened position. Alternatively a threaded hole may be made through the side of the nut 20 and a set screw inserted therein, or a fiber lock nut provided. In any event, means are provided for locking the nut 20 in a selective position upon the pintle. Also there are a plurality of holes 28 through the base plate and second plate each hole the same distance from the pintle 16. Therefore the second plate may be indexed to a desired position and pin 30 placed through the hole 28 in the second plate and extended down through a hole in the base plate. Thus it may be seen that means are provided to securely lock to the second plate in a plurality of selected positions relative to the base plate.

Two ears 32 are securely attached to the second plate by welding or otherwise. These ears are located equal distance from the hole 24 and extend upward. Each ear has a plane surface which is parallel to the plane surface on the other. The axis of the pintle 16 is parallel to these two plane surfaces. Each ear has a plurality of holes 34 therethrough. These holes are in pairs, each hole on one ear being aligned with a corresponding hole in the opposite ear; the axis of these aligned holes being at right angles to the axis of the pintle. Two tabs 36 each have plane surfaces on one side thereof which contact the plane surfaces of the ears 32. Likewise each tab has a hole therein which is aligned with the hole in the other tab. The tabs are attached to the ears by bolt 38 which extends through the holes in each tab and a pair of aligned holes in the ears. The bolt is threaded on one end and has nut 40 thereon. Tightening the nut causes the tabs and ears to be pressed together so as to lock the tabs in an adjusted position. Sleeve 42 is around the bolt between the ears and the length of the sleeve 42 is approximately the distance between the two ears. Thus it may be seen that when the nut 40 is tightened it does not tend to bend the ears and tabs but tends to compress them relative to the sleeve.

Two straight free bars 44 are each attached to both tabs. It will be understood that bars 44 could be other than solid square bars, e.g. they could be L shaped angles. It may be seen that the tabs are notched between the area 46 where the bars are attached. Expressed otherwise the tabs are vaguely U-shaped with bolt 38 through the base thereof and having a bar attached to each of the upper insides of the upper extending arms. At least they have a notch 46 adjacent to and below the bars. This notch provides passageway for the head of bolt 48 which passes within the slot between the two parallel bars 44. The attachment of the bars to the tab may be welding or otherwise so that a secure attachment is made.

The bars 44 are parallel to each other and parallel to the bolt 38. If the plane surface 14 is in a horizontal position, regardless of how the second plate is rotated about the pintle, the bolt 38 will likewise always be horizontal. Also regardless of how the tabs are rotated about the bolt, the two parallel bars and the space between them will be horizontal, i.e. one end of the bar will be at the same elevation as the other. Therefore when the work piece is attached to the bolts 48 there is no tendency for it to slide off one end of the bars through the openings provided.

This feature makes it quite easy to attach heavy work pieces to the holder. It is remembered that the bars are free except for their attachment to the tabs. By this it is meant that the bars are not otherwise attached to one another or to any other object. Therefore if a heavy work piece such as the head of a truck or tractor engine is to be attached to the work holder, the bolts 48 may be screwed into suitable openings such as the openings for the intake manifold when it is in a rest position. Then the head may be lifted and one bolt passed into the slot between the two bars 44. They can be inserted at one end and moved all the way to the other end. Once one bolt has passed within the slot there is no danger of it falling out unless it is purposely pulled out. This is because the slot is horizontal and does not slope downward. Also the bolt can be slid past the tab connections until the second bolt is within the slot. At that time the head is on the holder without danger of falling off. Without strain the mechanic can tighten the bolt 48 to securely attach the head to the holder. After this is done the nut 40 on bolt 38 may be loosened and the head indexed to the desired angle and nut 40 tightened to maintain the angle. Likewise the nuts 26 and 20 may be loosened on the pintle and the holder with the work attached rotated to the side position. This is particularly desirable when it is considered that some mechanics are left-handed.

It will be apparent that the embodiment shown is only exemplary and that various modifications can be made in construction, materials, and arrangement within the scope of the invention as defined in the appended claims.

I claim as my invention:

1. A work holder comprising: a base plate having a plane surfaced lower side, the plate having a plurality of holes therethrough for attaching it to a support, a pintle on the opposite side of the plate from said plane surface normal thereto, a second plate with a hole in the center thereof, the pintle extending through the hole in the second plate, two ears extending upward from and attached to the second plate, each ear having a plane surface parallel to each other, the pintle extending in the same direction as the ears with the respect to the plate, one ear on either side of the pintle, each ear having a hole therethrough aligned with the hole in the other ear, two tabs each having a plane surface contacting a plane surface on one of the ears, a hole in each tab, a bolt extending through the holes in the ears and tabs, the bolt at a right angle to the pintle, screw threads and a nut on one end of the bolt so that the tabs may be clamped to the ears, and two straight free bars, each bar securely attached to each tab at each side of the mid-point of the bar, the sole connection of the bars being to the tabs, each bar parallel to the bolt, so that the bars are at all times parallel to the plane surface of the base plate and a work piece may be attached to the bars by bolts extending through the bars.

2. The invention as defined in claim 1 wherein the pintle is threaded and has a nut above the second plate so that the second plate may be clamped in selected positions to the base plate.

3. The invention as defined in claim 1 wherein the base plate and second plate have holes therethrough an equal distance from the pintle and a pin through a selected hole in each of the second plate and base plate thereby locking the two plates in a selected relationship.

4. The invention as defined in claim 2 wherein each ear has a plurality of holes therethrough whereby the tabs and thus the bars may be connected at adjusted distances above the plates.

5. The invention as defined in claim 1 with the addition of a sleeve around the bolt between the ears so that when the nut on the bolt is tightened the tabs and ears are compressed against the sleeve.

6. The invention as defined in claim 1 wherein each tab has a notch therein between the two bars so that a bolt with a head may be passed from one end of the bars to the other.

References Cited in the file of this patent
UNITED STATES PATENTS

| | | |
|---|---|---|
| 1,414,970 | Nelson | May 2, 1922 |
| 2,135,765 | Paine | Nov. 8, 1938 |
| 2,227,688 | Wood | Jan. 7, 1941 |
| 2,460,944 | Nighthart | Feb. 8, 1948 |

FOREIGN PATENTS

| | | |
|---|---|---|
| 538,837 | Great Britain | Aug. 19, 1941 |